May 16, 1967  L. A. LYSTAD ETAL  3,319,487
VEHICLE CONTROL PEDALS
Filed Jan. 9, 1964
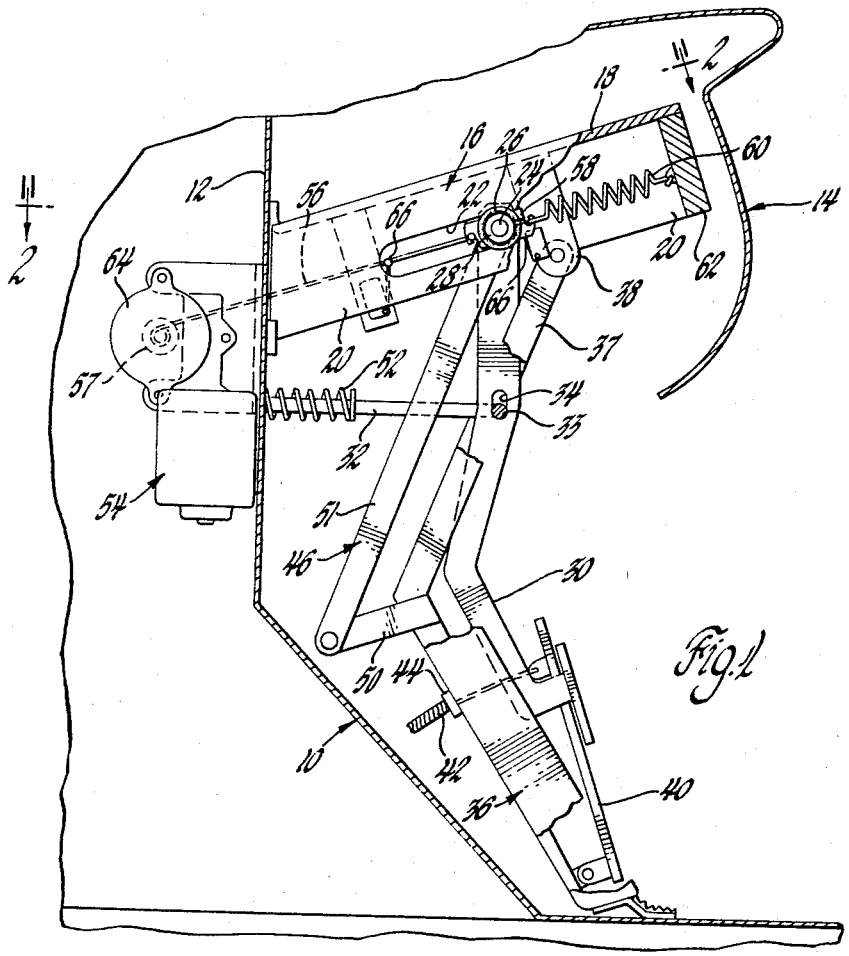
Fig.1
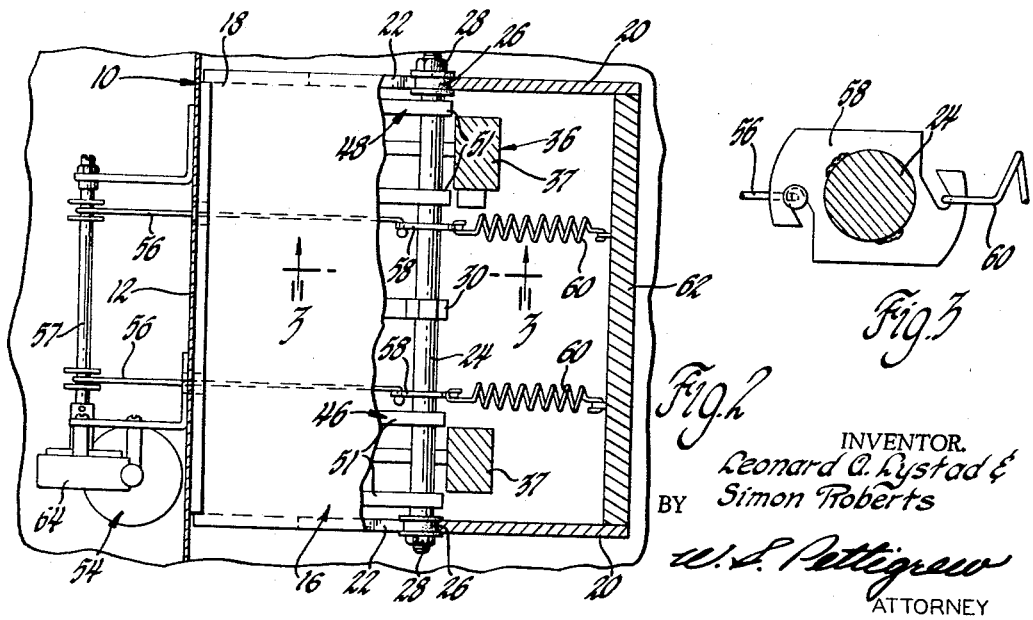
Fig.2
Fig.3
INVENTOR.
Leonard A. Lystad &
BY  Simon Roberts
W. S. Pettigrew
ATTORNEY

United States Patent Office 3,319,487
Patented May 16, 1967

3,319,487
VEHICLE CONTROL PEDALS
Leonard A. Lystad, Warren, and Simon Roberts, Detroit, Mich., assignors to General Motors Corporation, Detroit, Mich., a corporation of Delaware
Filed Jan. 9, 1964, Ser. No. 336,817
5 Claims. (Cl. 74—560)

This invention relates to vehicle control pedals and more particularly to an adjustable vehicle control pedal arrangement.

It has been proposed to mount vehicle passenger seats directly on the vehicle body rather than mounting them on seat adjuster mechanisms which are susceptible to breakage or unwanted release under force of collision or sudden braking. To accomplish this and yet maintain the longitudinal adjustment required between the seat and the vehicle control pedals for operators of various size, it is proposed to provide for such adjustment in the control pedals themselves. It has further been found desirable that such adjustment of the pedals be provided additionally in vertical directions to correspond to vertical adjustment of the passenger seat. As an additional consideration, it is desirable that the adjustable pedal arrangement include a movable toe board or rest piece for the operator's feet and that the toe board be coordinatively adjustable with the pedals to maintain the desired spacing therebetween.

Accordingly, this invention has as its primary object to provide a vehicle control pedal arrangement wherein the pedals are adjustable relative to the vehicle body. Another object of this invention is to provide a vehicle control pedal arrangement wherein the pedals are adjustable in both longitudinal and vertical directions relative to the vehicle body. A further object of this invention is to provide a vehicle control pedal arrangement wherein the pedals are adjustable about a fulcrum provided by the connecting means between a pedal and the mechanism which the pedal is to operate. Still another object of this invention is to provide a vehicle control pedal arrangement including a toe board coordinatively adjustable with the pedals relative to the vehicle body.

These and other objects of the invention will be readily apparent from the following specification and drawings wherein:

FIGURE 1 is a fragmentary partially broken away sectional view of a vehicle body embodying a control pedal arrangement according to this invention;

FIGURE 2 is a partially broken away view taken generally along the plane indicated by line 2—2 of FIGURE 1; and FIGURE 3 is an enlarged sectional view taken generally along the plane indicated by line 3—3 of FIGURE 2.

Refering now to FIGURE 1 of the drawing, a vehicle body designated generally as 10 includes a dash panel 12 separating the forward engine compartment from the passenger compartment, and an instrument panel 14 spaced from panel 12. A generally channel-shaped control pedal mounting bracket 16 is secured at its forward end to panel 12 and includes an upper base wall 18 and side walls 20. An elongated generally horizontal slot 22 is provided in each side wall 20 and a control pedal mounting shaft 24 extends between side walls 20 and carries a flanged nylon bushing 26 on either end thereof engaging respective slots 22 for slidable movement of the shaft therein. Nuts 28 are threaded on either end of shaft 24 to securely locate the shaft and bushings in bracket 16.

As shown best in FIGURE 2, a vehicle control pedal 30 is journaled at its upper end on shaft 24 for swinging movement relative thereto from a nonactuating position, as shown, to a depressed actuating position. A control rod 32 extends rearwardly through dash panel 12 from a controlled mechanism, such as a brake, not shown, and has its rearward end 33 pivotally received in a slot 34 in pedal 30 so as to actuate the mechanism upon depression of the pedal.

Referring now to FIGURE 1, a toe board 36 of generally flat construction is spaced a predetermined distance from pedal 30 to provide a convenient foot rest for the vehicle operator and includes a pair of hanger arms 37 swingably mounted at their upper ends on spaced depending legs 38 of bracket 16. An accelerator pedal 40 is pivotally mounted adjacent its lower end on toe board 36 and has connected thereto a flexible control cable 42 supported on the toe board at 44 and connecting with the vehicle throttle mechanism, not shown.

Two spaced sets of toe board control linkages 46 and 48 for adjustment of toe board 36 each include a link 50 secured to toe board 36, and a pair of links 51 swingably mounted at their upper ends on shaft 24 and pivotally connected at their lower ends to respective links 50.

It will be observed that slots 22 provide for a predetermined amount of fore-and-aft movement of shaft 24, and, as will be described, this movement provides for the required adjustment of pedal 30 and toe board 36 relative to the vehicle body to suit the needs of an individual vehicle operator. Pedal 30 is adjustable about a fulcrum provided by the rearward end 33 of rod 32 such fulcrum being at least partially established by a coil spring 52 secured at one end thereof to rod 32 and secured at the other end to panel 12. The spring is operative in compression to maintain rod 32 in the inoperative position shown during movement of shaft 24 forwardly, and is operative in tension to hold rod 32 during rearward movement of the shaft. It will be understood that the spring 52 is only one suggested practical means of providing such a fulcrum, and that it might be found that the resistance to actuation of the brake or other mechanism may be used for such purpose, either solely, or together with such means as spring 52.

Concurrently with any adjustment of pedal 30, there occurs a coordinated adjustment of toe board 36 by means of the linkages 46 and 48. Movement of the shaft 24 produces a force through links 51 resolving through links 50 into tangential forces pivoting the toe board about its upper end in a direction opposite to the direction of movement of the shaft 24 and in coordinated amounts to that of the control pedal 30. Thus, for example, as shaft 24 is moved forwardly, the lower portion of toe board 36 moves over a coordinated distance with that of the lower end of the pedal 30 about rod end 33 so as to maintain the predetermined operating distance between the toe board and pedal and also to maintain a coordinated adjustment between the pedal 30 and the accelerator pedal 40. It will further be noted that pedals 30 and 40 are adjusted in both longitudinal and vertical directions over a circular path so as to correspond to vertical adjustment of the passenger seat usually accompanying longitudinal adjustments between the control pedals and passenger seat. Slot 34 in pedal 30 accommodates any misalignment between a true circular path of pedal 30 about rod 32.

In the embodiment shown, a reversible motor driven pulley system 54 mounted on panel 12 is used to actuate the control pedal and toe board arrangement to any desired adjusted position. Referring to FIGURE 2, a pair of cables 56 are wrapped over a motor driven pulley shaft 57 and each is connected to a member 58 fixed to shaft 24. A pair of coil tension springs 60 are each hooked at one end to the other arm of a respective member 58, and at their other end to a rearward vertical wall 62 of bracket 16. To adjust the pedals and toe board rearwardly, pulley system 54 may be actuated to wrap cables 56 on the pulley shaft 57 to move shaft 24 forwardly in slots 22 against the action of springs 60. To actuate the shaft rearwardly and the pedals forwardly, the motor of pulley system 54 may be reversed to permit springs 60 to return shaft 24 rearwardly to any desired position of the pedals. An irreversible reduction gear arrangement 64 holds the pedals in any selected position against the action of springs 60. Limit switch means 66 may be provided at either end of slots 22 to automatically stop the pulley system in either direction.

Thus a new and improved vehicle control pedal arrangement is provided.

We claim:

1. In combination with a vehicle body, a control pedal arrangement comprising, a control pedal, pedal mounting means, first means swingably mounting said control pedal adjacent one end thereof on said pedal mounting means for movement relative thereto, and second means mounting said pedal mounting means on said body for swingable adjustment of said pedal mounting means and said control pedal as a unit relative to said body about an axis intermediate the ends of said control pedal.

2. In combination with a vehicle body, a control pedal arrangement comprising, a control pedal, adjustable means swingably mounting said control pedal adjacent one end thereof on said body, and means connecting said control pedal at a point intermediate the ends thereof to a mechanism to be operated, said connecting means providing a fulcrum for movement of said control pedal and said adjustable mounting means thereabout as a unit relative to said body to provide for positional adjustment of said control pedal relative to said body.

3. In combination with a vehicle body, a control pedal arrangement comprising, pedal mounting means, a control pedal swingably mounted adjacent one end thereof on said pedal mounting means, means movably mounting said pedal mounting means on said body, means operatively connecting said control pedal at a point intermediate the ends thereof to a mechanism to be operated, said connecting means providing a fulcrum for movement of said control pedal and said pedal mounting means thereabout as a unit relative to said body, movement of said control pedal relative to said pedal mounting means operating said mechanism, movement of said control pedal and said pedal mounting means as a unit about said fulcrum providing positional adjustment of said control pedal relative to said body, and means for locating said control pedal and said pedal mounting means in a selected position relative to said body.

4. In combination with a vehicle body, a control pedal arrangement comprising, pedal mounting means, a control pedal swingably mounted adjacent one end thereof on said pedal mounting means, means movably mounting said pedal mounting means on said body, means operatively connecting said control pedal at a point intermediate the ends thereof to a mechanism to be operated, said connecting means providing a fulcrum for movement of said control pedal and said pedal mounting means thereabout as a unit relative to said body, movement of said control pedal relative to said pedal mounting means operating said mechanism, movement of said control pedal and said pedal mounting means as a unit about said fulcrum providing positional adjustment of said control pedal relative to said body, resilient means urging said control pedal and said pedal mounting means in one direction about said fulcrum, and means for locating said control pedal and said pedal mounting means in a selected position against the action of said resilient means.

5. In combination with a vehicle body, an adjustable toe board and control pedal arrangement comprising, a toe board movably mounted on said body for adjustment relative thereto, a control pedal, adjustable means swingably mounting said control pedal on said body, means connecting said control pedal to a mechanism to be operated, said connecting means providing a fulcrum for movement of said control pedal and said pedal mounting means as a unit relative to said body, and means interconnecting said toe board and said pedal mounting means for coordinated adjustment of said toe board with said pedal.

References Cited by the Examiner

UNITED STATES PATENTS

| 1,929,409 | 10/1933 | Carr. | |
| 2,129,851 | 9/1938 | Lee | 180—77 |
| 2,610,006 | 9/1952 | Boyce | 74—512 X |
| 2,860,720 | 11/1958 | Huff et al. | 180—90.6 |
| 3,108,651 | 10/1963 | Miller | 74—560 X |
| 3,151,499 | 10/1964 | Roe | 74—560 |
| 3,178,962 | 4/1965 | Peras | 74—560 X |

FOREIGN PATENTS 920,784   3/1963   Great Britain.

OTHER REFERENCES

"Sunbeam Alpine Series III," from Autocar, Mar. 15, 1963, vol. 118, No. 3500, pp. 434–435.

FRED C. MATTERN, Jr., *Primary Examiner.*

C. F. GREEN, *Assistant Examiner.*